Patented Nov. 18, 1924.

1,516,337

UNITED STATES PATENT OFFICE.

ALEXANDER CHARLES CUMMING, OF LIVERPOOL, ENGLAND.

PURIFYING LIQUIDS.

No Drawing. Application filed September 29, 1922. Serial No. 591,419.

*To all whom it may concern:*

Be it known that I, ALEXANDER CHARLES CUMMING, a subject of the King of Great Britain, residing at Liverpool, in the county of Lancaster and Kingdom of England, have invented a certain new and useful Improvement in Purifying Liquids, of which the following is a specification.

This invention relates to improvements in purifying materials and especially to the decolourization and clarification of fats, oils, sugars and other materials that can be more or less decolourized by bone charcoal.

Hitherto it has been proposed to use bone charcoal or the like or the special active charcoal termed decolourizing carbon which may be made by incineration of wood with the aid of special treatment to activate the carbon; such products are commercially sold as "Carboraffin," "Norit," "Eponit" or the like.

The present invention depends on the discovery that gas black is excellently suitable for this purpose provided that the material is substantially free from oil. In such cases the material has excellent decolourizing properties and yet it can be readily filtered from the solution in spite of its very fine state of division.

By the term gas black, we refer to a well known commercial product which is manufactured at present for use in rubber manufacture and for lithographic inks or for other purposes by the decomposition or incomplete combustion of hydrocarbons such as natural gas, but we also apply the term to products manufactured by some but not all similar methods, provided that the product is substantially free from oil.

Many samples of commercial gas black contain sufficient oil to make them entirely unsuitable. The small amount of oil necessary to produce a deleterious effect may be illustrated by the fact that the decolourizing power of gas black is considerably reduced if even 1% of lamp black is incorporated therewith.

Gas black which is inactive or feebly active on account of the presence of oily matter may be made highly active by treatment to remove the oil; heating for a short time to a red heat is a convenient and suitable method for effecting this and the invention includes such a method of treating gas black or the like.

The invention does not include the use of decolourizing carbons (made by incinerating vegetable material) or of lamp black (made by incomplete combustion of oil or of other forms of carbon except gas black as defined above). The material is preferably used at low temperatures either for partial or complete clarification or decolourizing of liquids. It may also be used to assist filtration of a liquid containing finely divided solids.

The gas black may be used either alone or mixed with other substance, such as china clay or kieselguhr, which may be so chosen as to improve the filtering qualities of the mixture.

I declare that what I claim is:—

1. The process of purifying liquid which comprises treating them with gas black which is substantially free from oil.

2. The process of purifying aqueous liquid which comprises treating them with gas black which is substantially free from oil.

3. The process of purifying sugar solutions which comprises treating them with gas black which is substantially free from oil.

4. The process of decolourizing liquids which comprises adding substantially oil-free gas black thereto, and filterng the decolourized liquid therefrom.

5. The step in the process of treating liquids which comprises filtering a mixture of the liquid with substantially oil-free gas black.

6. The process of purifying liquids which comprises treating them with carbon-black made from natural gas and substantially free from oil.

In witness whereof, I have hereunto signed my name this 14th day of Sep., 1922, in the presence of two subscribing witnesses.

ALEXANDER CHARLES CUMMING.

Witnesses:
JOHN McLACHLAN,
DOROTHY GODY.